United States Patent [19]
McKie et al.

[11] Patent Number: 4,786,659
[45] Date of Patent: Nov. 22, 1988

[54] LOW WARP FILLED POLYOXYMETHYLENE COMPOSITIONS

[75] Inventors: Derrick B. McKie, Brooklyn, N.Y.; Andris Olukalns, Cincinnati, Ohio

[73] Assignee: Hoechst Celanese Corporation, Chatham, N.J.

[21] Appl. No.: 940,471

[22] Filed: Dec. 19, 1986

[51] Int. Cl.⁴ .................... C08K 7/20; C08K 3/40
[52] U.S. Cl. ...................... 523/220; 523/223; 523/444; 524/494; 524/542; 524/593
[58] Field of Search ............... 523/220, 223; 524/494, 524/593

[56] References Cited

U.S. PATENT DOCUMENTS

| | | | |
|---|---|---|---|
| 3,455,867 | 7/1969 | Berardinelli et al. | 260/37 |
| 3,901,846 | 8/1975 | Freed | 260/37 |
| 4,480,071 | 10/1984 | Natarajen et al. | 524/593 |
| 4,613,634 | 9/1986 | McKie | 523/223 |
| 4,652,594 | 3/1987 | Auerbach et al. | 524/593 |

OTHER PUBLICATIONS

*Handbook of Fillers and Reinforcements for Plastics,* Van Nostrand Reinhold Company, 1978, Chapter 4, pp. 66–78.

*Primary Examiner*—John C. Bleutge
*Assistant Examiner*—David W. Woodward
*Attorney, Agent, or Firm*—Depaoli & O'Brien

[57] ABSTRACT

A low warp, filled polyoxymethylene composition comprises a bimodal distribution of glass beads.

13 Claims, No Drawings

LOW WARP FILLED POLYOXYMETHYLENE COMPOSITIONS

FIELD OF THE INVENTION

This invention relates to low warp, filled polyoxymethylene compositions. More particularly, this invention relates to glass bead filled polyoxymethylene compositions which when molded into products exhibit improved surface appearance and low warpage.

BACKGROUND OF THE INVENTION

The terms oxymethylene polymer and polyoxymethylene as used interchangeably herein are meant to include oxymethylene homopolymers and diethers and diesters. Also included are oxymethylene copolymers, which includes oxymethylene polymers having at least 60 percent recurring oxymethylene units and at least one other unit derived from a monomer copolymerizable with the source of the oxymethylene units.

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

During molding processes, oxymethylene polymers are generally heated to temperatures between about 180° and 220° C. for relatively short periods between about 3 and about 10 minutes. Unless the thermal degradation rate of the polymer has been reduced to a desirably low level it has been found that molded products have uneven surface characteristics, due to gassing. In order to ameliorate this defect and reduce the degradation to a desirable level, chemical stabilizers are added to oxymethylene polymers.

The physical properties of these oxymethylene polymers can also be enhanced by addition to the polymers of glass strands, such as chopped glass fibers. In so doing, the tensile strength, flex strength and modulus are increased but the thermal coefficient of expansion of the polymer is reduced and warpage is significantly increased. Unfortunately, addition of these glass fibers also has had an undesirable effect on thermal stability and impact strength, thus limiting the use, to a certain degree, to which the thus-filled oxymethylene polymers might be put. Another drawback is that the molded reinforced oxymethylene polymers often exhibit rough surfaces because the reinforcing agents tend to extend through the polymer surface.

It is known in the art that the incorporation of glass strands into oxymethylene polymer in the presence of a small but effective amount of a halogen acid significantly improves the physical properties of these glass-filled oxymethylene polymers. The preferred halogen acid-yielding additives contemplated herein are the ammonium and amine salts of hydrogen chloride, hydrogen bromide and hydrogen iodide. Very desirable results are also achieved by using the acids per se, aluminum chloride plus water, polyvinyl chloride, and like halogen acid (HX)-yielding compounds. Generally, from 0.001% by weight to 0.1%, or slightly greater, of the acid is present for good results, the percentage by weight being based upon the total weight of the polymer. Preferably, from 0.005% to 0.02% by weight is employed. The glass strands, on the other hand, may be present, and preferably are present, in substantially greater amounts. For example, good results may be achieved when blending equal weights of oxypolymer and glass strands. Enhanced properties are achieved using as little as 10 weight percent glass strands based upon the total weight of the glass and polymer in the composition. This is particularly true when using chopped glass fibers in the one-sixteenth (1/16") inch to one-half (½") inch size range.

It is also known in the art that incorporation of both an isocyanate and glass strands in oxymethylene polymers, preferably in the presence of a small but effective amount of catalyst, has a potentiating or synergistic effect on the physical properties of these polymers (U.S. Pat. No. 3,455,867). For reasons which are not fully understood, not only are tensile strength and flex strength improved, but impact strength is enhanced. Insofar as tensile strength and flex strength are concerned, the cooperative effect of the isocyanate and glass strands in the polymer is such that the total effect of these is greater than the sum of the two effects taken independently. This phenomenon is even more accentuated by the presence of the catalyst. However, a chemical reaction is required and, thus, it is difficult to control this in-situ reaction to obtain a reproducible product.

Another filled oxymethylene polymer composition known in the art is disclosed in U.S. Pat. No. 3,901,846 and includes a filler and small amounts of specific high molecular weight phenoxy resins and exhibits improved physical properties and surface effects of the molded articles. It is disclosed that the type of filler that can be used includes glass fibers (chopped or continuous rovings), asbestos fibers, cellulosic fibers, synthetic fibers, including graphite fibers, acicular calcium metasilicate and the like. The amount of reinforcing agent can range from about 2 to about 60 weight percent, preferably 5 to 60 weight percent based on the total molding composition. The phenoxy resins disclosed as useful are characterized by a repeating structure:

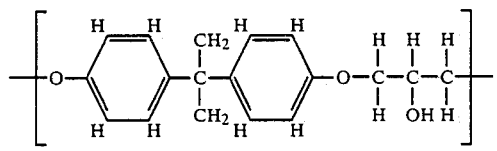

and have an average molecular weight range of from about 15,000 to 75,000. As is obvious, the terminal structure is completed with hydrogen atoms or some suitable end capping groups. The thermoplastic phenoxy resin can be added to the reinforced oxymethylene resin in a number of ways (1) by incorporating the phenoxy resin into the reinforcing agent prior to its intimate blending with the oxymethylene resins, (2) by simultaneously intimately mixing with the reinforcing agent and the oxymethylene resins and (3) by blending with the polymer and intimately blending with the reinforcing agents. Other mixing techniques can be used. The amount of phenoxy resin incorporated can range from about 0.1 to about 8 weight percent preferably from about 0.5 to about 3 weight percent of the total thermoplastic oxymethylene molding resin.

Commonly assigned U.S. Pat. No. 4,613,634 discloses a low warp, filled oxymethylene polymer composition containing 1 to about 60 wt. % glass beads having an average bead diameter distribution of from greater than 0 up to 300 microns, and a thermoplastic phenoxy resin as heretofore described. As compared with the glass fiber compositions of U.S. Pat. No. 3,901,846, the glass bead-filled oxymethylene polymer compositions have greatly reduced warpage.

While reinforced polyoxymethylene polymers are outstanding thermoplastic molding resins and each of the above-described prior art compositions is useful, it is still desired to improve the combination of surface appearance flexural modulus, tensile strength, and low warpage in the products molded from these resin composites which some applications require. The present invention provides such a composition.

SUMMARY OF THE INVENTION

The present invention provides a filled oxymethylene polymer composition which when molded into products exhibits improved surface appearance and low warpage as compared to products molded from prior glass fiber and glass bead filled oxymethylene polymers.

The molding composition of the present invention comprises from about 40 to 99 wt. % of the total composition of a normally solid oxymethylene polymer and from about 1 to about 60 wt. % based on the total composition of glass beads wherein glass beads of two different diameter size distributions are used in the composition. The bimodal size distribution of glass bead filler in the oxymethylene polymer composition of the present invention comprises the use of relatively large glass beads of about 65 to about 2,800 microns mean diameter and relatively small glass beads of about 5 to about 200 microns mean diameter. The amount of relatively large glass bead filler used relative to the relatively small glass bead filler can vary from a 9:1 to a 1:9 weight ratio.

It has unexpectedly been found that by incorporating glass beads of two different size distributions into an oxymethylene polymer substantial reductions in warpage are obtained relative to the incorporation of glass beads of a single size distribution. Moreover, impact and tensile strengths of the oxymethylene polymer compositions filled with glass beads having a bimodal size distribution are substantially the same as those obtained from oxymethylene polymer compositions filled with a unimodal size distribution of glass beads. Inasmuch as the tensile strength of oxymethylene polymers decreases with increasing glass filler loading, for equivalent flatness, the bimodal glass bead filled product formed from the compositions of the present invention have superior tensile strength over a unimodal glass bead filled product due to a lower glass bead loading requirement.

DESCRIPTION OF PREFERRED EMBODIMENTS

The oxymethylene polymer used in the molding composition of the present invention is well known in the art. The polymers are characterized as having recurring oxymethylene groups or units, i.e., —CH$_2$O—. The term oxymethylene polymer as used herein is intended to include any oxymethylene polymer having —CH$_2$O—groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds.

The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) —OCH$_2$—groups interspersed with (b) groups represented by the general formula:

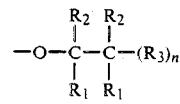

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$—units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g, BF$_3$, PF$_5$, and the like) or other acids (e.g., HClO$_4$, 1% H , and the like).

In general, the cyclic ethers employed in making the preferred oxymethylene copolymers are those represented by the general formula:

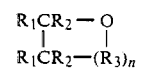

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

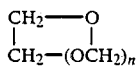

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably present in the molding compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the molding composition of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in U.S. Pat. No. 3,219,623 to Berardinelli.

If desired, the oxymethylene copolymer may be end-capped by techniques known to those skilled in the art. A preferred end-capping technique is accomplished by acetylation with acetic anhydride in the presence of sodium acetate catalyst. A preferred oxymethylene copolymer is commercially available from Celanese Corporation under the designation CELCON® acetal copolymer, and especially preferred is CELCON® M270 which has a melt index of about 27.0g/10 min. when tested in accordance with ASTM D1238-82.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

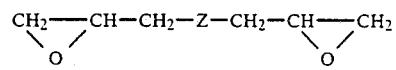

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1, 4-diol and 2-dimethyl-4-dimethylcyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer.

The trioxane-based terpolymer polymerization is advantageously carried out at temperatures at which trioxane does not crystallize out, that is, at a temperature within the range of $-50°$ C. to $+100°$ C., depending on the solvent used, and in the absence of a solvent at a temperature within the range of 20° C. to $+100°$ C.

As trioxane-based terpolymer polymerization catalyst, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolymer in the same manner as known for other oxymethylene polymers. Advantageously, the terpolymer is suspended in aqueous ammonia at temperature within the range of 100° to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

It is also possible to thermally stabilize the terminal groups of the terpolymers in the absence of a solvent in the melt in the presence of a stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° to 250° C. for a specified period of time, and then washed with water and dried or centrifuged.

A preferred oxymethylene terpolymer is commercially available from Celanese Corporation under the designation U10, and is a butanediol diglycidyl ether-/ethylene oxide/trioxane terpolymer containing about 0.05 weight percent, 2.0 weight percent, and 97.95 weight percent of each component, respectively.

It is within the ambit of the present invention to use oxymethylene polymers that include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties including enhancement of impact strength of the resulting molding composition and the articles molded therefrom.

Suitable formaldehyde scavengers include cyanoguanidine, melamines, polyamides, amine-substituted triazines, amidines, ureas, hydroxyl salts of calcium, magnesium, and the like, salts of carboxylic acids, and metal oxides and hydroxides. Cyanoguanidine is the preferred formaldehyde scavenger. Suitable mold lubricants include alkylene bisstearamide, long-chain amides, waxes, oils, and polyether glycides. The preferred mold lubricant is commercially available from Glyco Chemical, Inc. under the designation Acrawax C and is alkylene bisstearamide. The preferred antioxidants are hindered bisphenols. Especially preferred is 1,6-hexamethylene bis-(3,5-di-t-butyl-4hydroxyhydrocinnamate), commercially available from Ciba-Geigy Corp. under the designation Irganox 259.

The glass beads useful in the present invention are commercially available from Potters Industries Inc., Hasbrouck ? Heights, N.J., an affiliate of the P.Q. Corporation, under the trademark Spheriglass. Of course, any commercially available glass beads are useful in the present invention as long as such beads have the desired size.

Bimodal packing theory teaches that the maximum packing density for spherical solids is approached when the size ratio of relatively large to small beads is infinity. For practical purposes and, in particular, for dilute systems of bimodally distributed glass beads as in the present invention wherein the glass beads are mixed with polymer, bead size ratios of between about 6:1 to about 550:1 are useful. Preferably the bead size ratio will be between 6:1 to 200:1 and, more preferably between about 6:1 to 50:1. Most preferred are bead size ratios between 13:1 to 14:1.

The actual sizes of the glass beads to be incorporated into the oxymethylene polymer compositions of the present invention can vary quite widely. Thus, relatively large glass beads having a mean diameter of from about 65 to about 2,800 microns and relatively small glass beads having a mean diameter of from about 5 to about 200 microns can be incorporated together into the polymer. Preferably, the glass beads will have a size distribution of about 65 to about 675 microns and, more preferably 65 to about 200 mean diameter for the relatively large glass beads and from about 5 to about 50 microns and, more preferably 5–15 micron mean diameter for the relatively small glass beads. Mean diameter as herein defined indicates the mean average diameter of a normal distribution of glass beads.

The beads, preferably, contain a typical glass coupling agent in amounts known to provide the desired ability to uniformly maintain the glass bead firmly in the polymer matrix. Such amounts are known to those of skill in the art, and generally comprise a monomolecular surface coating. When present, the surface coating is counted as part of the glass bead weight percentage.

The glass beads are present in a total amount of from about 1 to about 60 wt. % of the total composition, preferably from about 10 to about 40 wt. %, and more preferably from about 10 to about 30 wt. % of the total composition. A particularly preferred amount is from about 25 to 30 wt. % of the total composition.

The relative amounts of the relatively large diameter beads to the relatively small diameter beads incorporated into the polymer can vary widely, for example, fom a weight ratio of 1:20 to 20:1, preferably from about 1:10 to 10:1. More preferably, the relatively large size bead is incorporated in larger amounts than the relatively small size bead, for example in a weight ratio of 2:1 to 15:1, with a weight ratio of about 5:1 to 10:1 being more preferred.

The glass beads can be intimately mixed with the other components of the composition by either dry blending or melt blending using extruders, heated rollers or other types of mixers. If desired, the glass beads can be blended with the monomers in the polymerization reaction as long as the polymerization reaction is not effected.

Optionally, phenoxy resins can be incorporated into the compostion. The phenoxy resins useful in the composition of the present invention are high molecular weight thermoplastic resins which are produced from 2,2-bis(4-hydroxyphenyl) propane and epichlorohydrin according to the procedure as described in U.S. Pat. No. 3,356,646 which is incorporated herein by this reference. The basic chemical structure of the phenoxy resins is similar to that of epoxy resins. They are, however, a separate and unique resin class, differing from epoxides in several important characteristics:

1. Phenoxy resins are tough and ductile themoplastics. Their average molecular weight ranges from 15,000 to 75,000 preferably from 20,000 to 50,000 compared with 340 to 13,000 for conventional epoxides which crosslink on polymerization.
2. Phenoxy resins do not have terminal highly reactive epoxy groups and are thermally stable materials with a long shelf life.
3. The phenoxy resins can be used without further chemical conversion. They require no catalysts, curing agents or hardeners to be useful products while epoxy resins require catalysts, curing agents or hardeners to be useful.

The phenoxy resins can be characterized by a repeating structure:

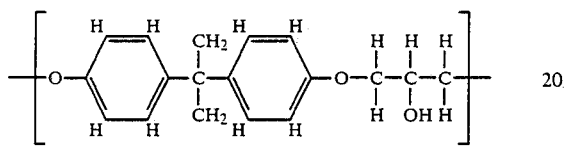

and have an average molecular weight range from about 15,000 to 75,000. As is obvious, the terminal structure is completed with hydrogen atoms or some suitable end capping groups.

The thermoplastic phenoxy resin can be added to the reinforced oxymethylene resin in a number of ways (1) by incorporating the phenoxy resin onto the glass beads prior to its intimate blending with the oxymethylene resins, (2) by simultaneously intimately mixing with the glass beads and the oxymethylene resins and (3) by blending with the polymer and intimately blending with the glass beads. Other mixing techniques can be used.

The amount of phenoxy resin in the composition can range from about 0.1 to about 5 wt. %, preferably from about 0.2 to about 2 wt. % and more preferably from about 0.2 to about 1.2 wt. % of the total composition.

EXAMPLES

The following examples present illustrative but non-limiting embodiments of the present invention. Unless otherwise stated, the oxymethylene polymers used in the following examples are oxymethylene copolymers of trioxane and ethylene oxide which were prepared as described in Example 1 of U.S. Pat. No. 3,254,053. Catalyst residues in the polymer were deactivated with an amine as described in U.S. Pat. No. 2,989,509, and the copolymers were then subjected to hydrolysis to remove unstable terminal units as described in U.S. Pat. No. 3,318,848 or U.S. Patent 3,174,948. All compositions tested included 0.2 wt. % Phenoxy PKHH, a high molecular weight polyhydroxy ether manufactured by Union Carbide Corporation, Danbury, Conn.

The various analysis referred to in the examples were conducted as described in the following ASTM procedures:

(a) Notched Izod Impact Strength, ⅛" bar, ASTM D256,
(b) Tensile Strength and Elongation, ASTM D638,
(c) Warpage was determined as follows:
  (1) Injection molded discs (4" diameter × 1/16" thick) were used to determine product warpage. Discs were conditioned for 24 hours at 23° C./50% relative humidity prior to evaluation. The thickness of each of ten discs molded from a given composition was measured in at least two areas parallel to the flow direction and two areas transverse to the flow direction. An average overall thickness was determined for the set of ten discs in this manner.
  (2) A thick, heavy granite platform called a bench comparator supporting a sensitive linear gauge was lowered onto the disc. The molded specimen was then rotated to determine the highest point on the disc as indicated by the maximum gauge readout. The greater the warpage of the disc, the higher the readout obtained. Gauge reading minus average disc thickness indicates warpage. This is given by the following equation:

$$W = H(m) - T(d)$$

where:
W = sample warpage
H(m) = maximum linear gauge readout
T(d) = overall average thickness for a set of sample discs.

EXAMPLE 1 compositions containing a polyacetal copolymer control and glass bead-filled polyacetal copolymers were fromulated on a 2½" Johnson extruder with standard multistage screw at a temperature of 375°–385° F. and screw RPM of 100. The compositions were molded into test samples in an 8 oz. Reed at a mold temperature of 190°–200° F. and injection pressure of 10,000 psi. The compositions were dried overnight at 105? F. prior to molding. The injection molded test samples were assessed for warpage, tensile properties and impact strength. The compositions varied relative to the size of the glass beads employed. Table 1 reports the compositions and the values of the tests.

TABLE 1

| | PHYSICAL PROPERTIES OF ACETAL COMPOUNDS | | | | |
|---|---|---|---|---|---|
| | Glass Bead Content [wt. %] | Warpage [in.] × 10⁻⁴ | Tensile | | Notched Izod Impact Strength [ft lb/in notch] |
| | | | Strength [kpsi] | Elongation [%] | |
| Celcon[1] M270 | 0 | 94 | 8.31 | 13.2 | 1.1 |
| Celcon with (30μ diam.) glass beads | 25.2 | 43 | 5.77 | 8.1 | 0.6 |
| Celcon with (200μ diam.) glass beads | 24.6 | 47 | 5.69 | 5.3 | 0.6 |
| Celcon with (15μ diam.) | 25.8 | 53 | 6.41 | 6.5 | 0.6 |

TABLE 1-continued
PHYSICAL PROPERTIES OF ACETAL COMPOUNDS

| Glass Bead Content [wt. %] | Warpage [in.] × 10⁴ | Tensile Strength [kpsi] | Tensile Elongation [%] | Notched Izod Impact Strength [ft lb/in notch] |
|---|---|---|---|---|
| glass beads | | | | |
| Celcon with 15μ/200μ; 9:1 glass beads  24.1 | 86 | 6.05 | 5.0 | 0.6 |
| Celcon with (15μ/200μ; 1:9) glass beads  26.1 | 29 | 5.71 | 5.4 | 0.6 |

¹Oxymethylene copolymer made by Celanese Corp., melt index is 27.0

EXAMPLE 2

Compositions comprising a glass bead filled polyacetal copolymer containing 15 micron diameter glass beads were prepared and evaluated for warpage, tensile properties and impact strength as in Example 1. The composition varied relative to the amount of glass bead content. The glass bead content and property assessment are reported in Table 2.

TABLE 2
PHYSICAL PROPERTIES OF ACETAL COMPOUNDS WITH (15 DIAM.) GLASS BEADS

| Glass Bead Content [wt. %] | Warpage [in.] × 10⁴ | Tensile Strength [kpsi] | Tensile Elongation [%] | Notched Izod Impact Strength [ft lb/in notch] |
|---|---|---|---|---|
| 4.7 | 48 | 7.74 | 18.4 | 0.6 |
| 9.4 | 49 | 7.47 | 13.8 | 0.6 |
| 21.0 | 51 | 6.93 | 8.0 | 0.6 |
| 25.8 | 53 | 6.41 | 6.5 | 0.6 |
| 30.6 | 38 | 5.92 | 5.2 | 0.6 |

EXAMPLE 3

Compositions comprising a glass bead filled polyacetal copolymer containing 200 micron diameter glass beads were evaluated for warpage, tensile properties and impact strength as in Example 1. The composition varied relative to the amount of glass bead content. The glass bead content and property assessment are reported in Table 3.

TABLE 3
PHYSICAL PROPERTIES OF ACETAL COMPOUNDS WITH (200μ DIAM.) GLASS BEADS

| Glass Bead Content [wt. %] | Warpage [in.] × 10⁴ | Tensile Strength [kpsi] | Tensile Elongation [%] | Notched Izod Impact Strength [ft lb/in notch] |
|---|---|---|---|---|
| 5.6 | 51 | 8.04 | 8.9 | 0.6 |
| 10.7 | 49 | 7.44 | 7.7 | 0.6 |
| 19.5 | — | 6.27 | 6.1 | 0.6 |
| 24.6 | 47 | 5.69 | 5.3 | 0.6 |
| 28.9 | 51 | 5.20 | 5.6 | 0.6 |

EXAMPLE 4

Compositions comprising a glass bead filled polyacetal copolymer containing 15μ/200μ diameter galss beads in a 1:9 ratio were evaluated for warpage, tensile properties and impact strength as in Example 1. The compositions varied relative to the total amount of glass bead content. The glass bead content and property assessment are reported in Table 4.

TABLE 4
PHYSICAL PROPERTIES OF ACETAL COMPOUNDS WITH 15μ/200μ DIAM.; 1:9 GLASS BEADS

| Glass Bead Content [wt. %] | Warpage [in.] × 10⁴ | Tensile Strength [kpsi] | Tensile Elongation [%] | Notched Izod Impact Strength [ft lb/in notch] |
|---|---|---|---|---|
| 4.4 | 41 | 7.81 | 8.1 | 0.5 |
| 10.0 | 37 | 7.46 | 7.2 | 0.6 |
| 19.3 | 37 | 6.37 | 6.2 | 0.6 |
| 26.1 | 29 | 5.71 | 5.4 | 0.6 |
| 29.3 | 31 | 5.18 | 5.1 | 0.5 |

What is claimed is:

1. A low warp, filled oxymethylene polymer composition comprising a normally solid oxymethylene polymer in an amount of from about 40 to 99 wt. % of the total composition and glass beads in an amount of from about 1 to 60 wt % of the total composition, said glass beads being present as a bimodal distribution of said glass beads comprising relatively large glass beads having a mean diameter of from about 65 to about 2,800 microns and relatively small glass beads having a mean diameter of from about 5 to about 200 microns, the ratio of mean diameters of said relatively large glass beads to said relatively small glass beads being about 6:1 to bout 550:1, the weight ratio of said relatively large glass beads to said relatively small glass beads comprising 2:1 to about 15:1.

2. The composition of claim 1 wherein the amount of glass beads ranges from about 10 to about 40 wt. %

3. The composition of claim 1 wherein said large glass beads have a mean diameter of from about 65 to about 675 microns.

4. The composition of claim 1 wherein said small glass beads have a mean diameter of from about 5 to about 50 microns.

5. The composition of claim 1 wherein said large glass beads have a mean diameter of from about 65 to about 200 microns.

6. The composition of claim 1 wherein said small glass beads have a mean diameter of from about 5 to about 15 microns.

7. The composition of claim 1 wherein the ration of mean diameters of said relatively large beads to said relatively small beads is from about 6:1 to about 200:1.

8. The composition of claim 1 wherein the ration of means diameters of said relatively large beads to said relatively small beads is from about 6:1 to about 50:1.

9. The composition of claim 1 wherein the ratio of mean diameters of said large beads to said relatively small beads is from about 13:1 to about 14:1.

10. The composition of claim 1 wherein said glass beads are present in amounts of from about 10 to about 30 wt. %.

11. The composition of claim 1 wherein the oxymethylene polymer is selected from the group consisting of:
(i) oxymethylene homopolymer,
(ii) oxymethylene copolymer comprising about 85 to about 99.9 percent recurring —OCH$_2$—groups interspersed with groups of the formula:

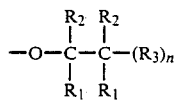

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and halo-alkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C., and
(iii) oxymethylene terpolymer, which is the reaction product of trioxane, a cyclic ether or cyclic acetal or mixtures thereof, and and a diglycide of the formula:

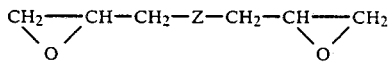

wherein in Z is selected from the group consisting of a carbon-to-carbon bond, oxygen, an oxyalkoxy of 1 to 8 carbon atoms, and an oxypoly.

12. The composition of claim 11 wherein the oxymethylene polymer is said homopolymer.

13. The composition of claim 11 wherein the oxymethylene polymer is said oxymethylene copolymer.

* * * * *